US009882278B2

(12) United States Patent
Liou et al.

(10) Patent No.: US 9,882,278 B2
(45) Date of Patent: Jan. 30, 2018

(54) ANTENNA SWITCHING SYSTEM AND WIRELESS COMMUNICATION DEVICE USING THE ANTENNA SWITCHING SYSTEM

(71) Applicant: Chiun Mai Communication Systems, Inc., New Taipei (TW)

(72) Inventors: Geng-Hong Liou, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 603 days.

(21) Appl. No.: 14/522,286

(22) Filed: Oct. 23, 2014

(65) Prior Publication Data

US 2015/0188220 A1 Jul. 2, 2015

(30) Foreign Application Priority Data

Dec. 31, 2013 (CN) .......................... 2013 1 0749264

(51) Int. Cl.
*H04B 7/00* (2006.01)
*H01Q 3/24* (2006.01)
*H01Q 1/24* (2006.01)

(52) U.S. Cl.
CPC ............... *H01Q 3/24* (2013.01); *H01Q 1/245* (2013.01)

(58) Field of Classification Search
CPC ................................ H01Q 3/24; H01Q 1/245
USPC ....................................................... 455/277.1
See application file for complete search history.

(56) References Cited

U.S. PATENT DOCUMENTS

2012/0052820 A1* 3/2012 Lin ..................... H04B 1/3838 455/90.2
2012/0071203 A1 3/2012 Wong
2013/0169507 A1 7/2013 Ko et al.

* cited by examiner

*Primary Examiner* — Sanh Phu
(74) *Attorney, Agent, or Firm* — ScienBiziP, P.C.

(57) ABSTRACT

An antenna switching system includes a first antenna, a second antenna, a first sensing unit, a second sensing unit, a controlling unit, and a switching unit. The first sensing unit detects a distance between an object and the first antenna. The second sensing unit detects a distance between the object and the second antenna. The controlling unit is electronically connected to the first sensing unit and the second sensing unit. The switching unit is electronically connected to the controlling unit, the first antenna, and the second antenna. The controlling unit is configured to activate and deactivate the first antenna and the second antenna via the switching unit based on detections of the first sensing unit and the second sensing unit.

20 Claims, 5 Drawing Sheets

ANTENNA SWITCHING SYSTEM AND WIRELESS COMMUNICATION DEVICE USING THE ANTENNA SWITCHING SYSTEM

CROSS-REFERENCE TO RELATED APPLICATIONS

This application claims priority to Chinese Patent Application No. 201310749264.2 filed on Dec. 31, 2013, the contents of which are incorporated by reference herein.

FIELD

The disclosure generally relates to an antenna switching system and a wireless communication device using the antenna switching system.

BACKGROUND

Antennas are important elements of wireless communication devices, such as mobile phones, or personal digital assistants. Generally, a position of the antenna in the wireless communication device is fixed. Thus, a radiating efficiency of the antenna will be affected when the wireless communication device is hold by a user.

BRIEF DESCRIPTION OF THE DRAWINGS

Implementations of the present technology will now be described, by way of example only, with reference to the attached figures.

DETAILED DESCRIPTION

Figure 1:
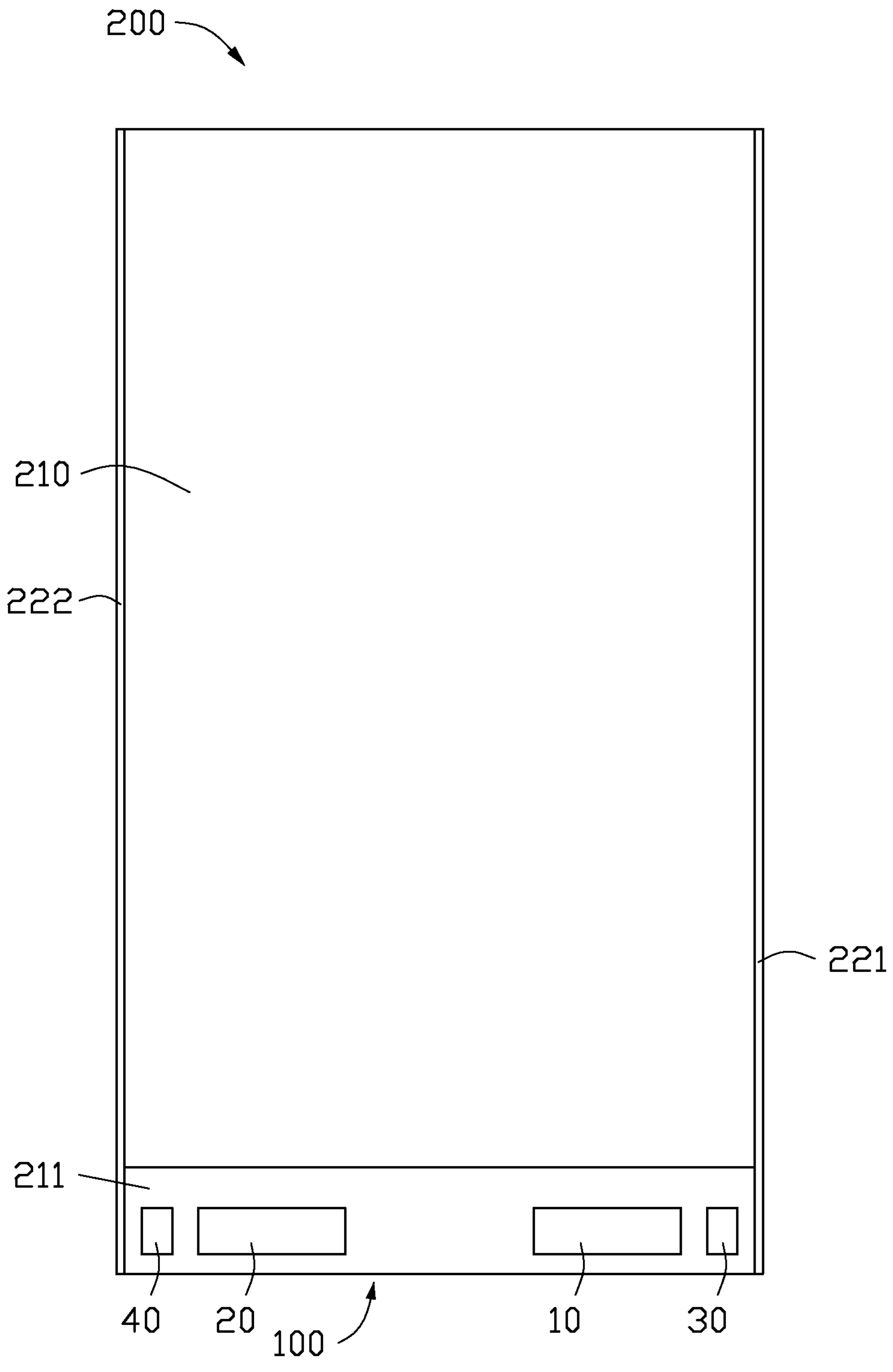
FIG. 1 is an isometric view of an embodiment of a wireless communication device employing an antenna switching system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series and the like.

FIG. 1 illustrates an embodiment of a wireless communication device 200. The wireless communication device 200 may be a mobile phone or a personal digital assistant, for example. The wireless communication device 200 includes a base board 210, a first metal member 221, a second metal member 222, and an antenna switching system 100.

In this embodiment, the base board 210 is a circuit board of the wireless communication device 200. The base board 210 is substantially rectangular and includes a keep-out-zone 211. In this embodiment, the keep-out-zone 211 is formed in a side of the base board 210. The purpose of the keep-out-zone 211 is to prevent other electronic elements (such as a battery, a vibrator, a speaker, a Charge Coupled Device, etc.) from being placed in a predetermined area where it may interfere with antennas positioned in the wireless communication device 200. The first metal member 221 and the second metal member 222 can both be a portion of a metal housing of the wireless communication device 200. In this embodiment, the first metal member 221 is positioned at a first side of the base board 210. The second metal member 222 is positioned at a second side of the base board 210 opposite to the first metal member 221.

The antenna switching system 100 includes a first antenna 10, a second antenna 20, a first sensing unit 30, and a second sensing unit 40. The first antenna 10 is positioned in the keep-out-zone 211 adjacent to the first metal member 221. In this embodiment, the first antenna 10 is a broadband antenna and can work at both a low-frequency band and a high-frequency band. In this embodiment, the low-frequency band has a frequency band of about 704-746 MHz (LTE Band 17) with a radiating efficiency of about 49-64%. The high-frequency band has a frequency band of about 1710-2170 MHz and 2500-2690 MHz (LTE Band 7) with a radiating efficiency of about 53-79%.

The second antenna 20 is positioned in the keep-out-zone 211 adjacent to the second metal member 222. The second antenna 20 is a high-frequency antenna and can work at the high-frequency band of the first antenna 10. That is, the second antenna 20 can work at the frequency band of about 1710-2170 MHz and 2500-2690 MHz (LTE Band 7) with a radiating efficiency of about 60-92%.

The first sensing unit 30 is positioned in the keep-out-zone 211 adjacent to the first antenna 10. In this embodiment, the first sensing unit 30 is positioned between the first metal member 221 and the first antenna 10. The first sensing unit 30 may be a proximity sensor. The first sensing unit 30 is configured to detect whether a distance between an object (for example, a palm of a user) and the first antenna 10 is in a predetermined range and output a corresponding sensing signal according to the detection. Generally, the first sensing unit 30 has a maximum sensing distance that the first sensing unit 30 can sense, for example, 3 mm. In this embodiment, the maximum sensing distance is equal to a distance between the palm of the user and the first antenna 10 when the user holds the right side of the wireless communication device 200, and the predetermined range is from about 0 mm to the maximum sensing distance of the first sensing unit 30. Thus, when a distance between the object and the first antenna 10 is in the predetermined range, the first sensing unit 30 outputs a first sensing signal (for example, a high level signal, logic 1). When the distance between the object and the first antenna 10 is out of the predetermined range, for example, the distance between the object and the first antenna 10 is about 4 mm, the first sensing unit 30 outputs a second sensing signal different from the first sensing signal (for example, a low level signal, logic 0).

The second sensing unit 40 is positioned in the keep-out-zone 211 adjacent to the second antenna 20. In this embodiment, the second sensing unit 40 is positioned between the second metal member 222 and the second antenna 20. The second sensing unit 40 may be a proximity sensor. The second sensing unit 40 is configured to detect whether a distance between the object and the second antenna 20 is in a predetermined range and output a corresponding sensing signal according to the detection. Generally, the second sensing unit 40 has a maximum sensing distance that the second sensing unit 40 can sense, for example, 3 mm. In this embodiment, the maximum sensing distance is equal to a distance between the palm of the user and the second antenna 20 when the user holds the left side of the wireless communication device 200, and the predetermined range is from about 0 mm to the maximum sensing distance of the second sensing unit 40. Thus, when a distance between the object and the second antenna 20 is in the predetermined range, the second sensing unit 40 outputs the first sensing signal. When the distance between the object and the second antenna 20 is out of the predetermined range, for example, the distance between the object and the second antenna 20 is about 4 mm, the second sensing unit 40 outputs the second sensing signal.

Figure 2:
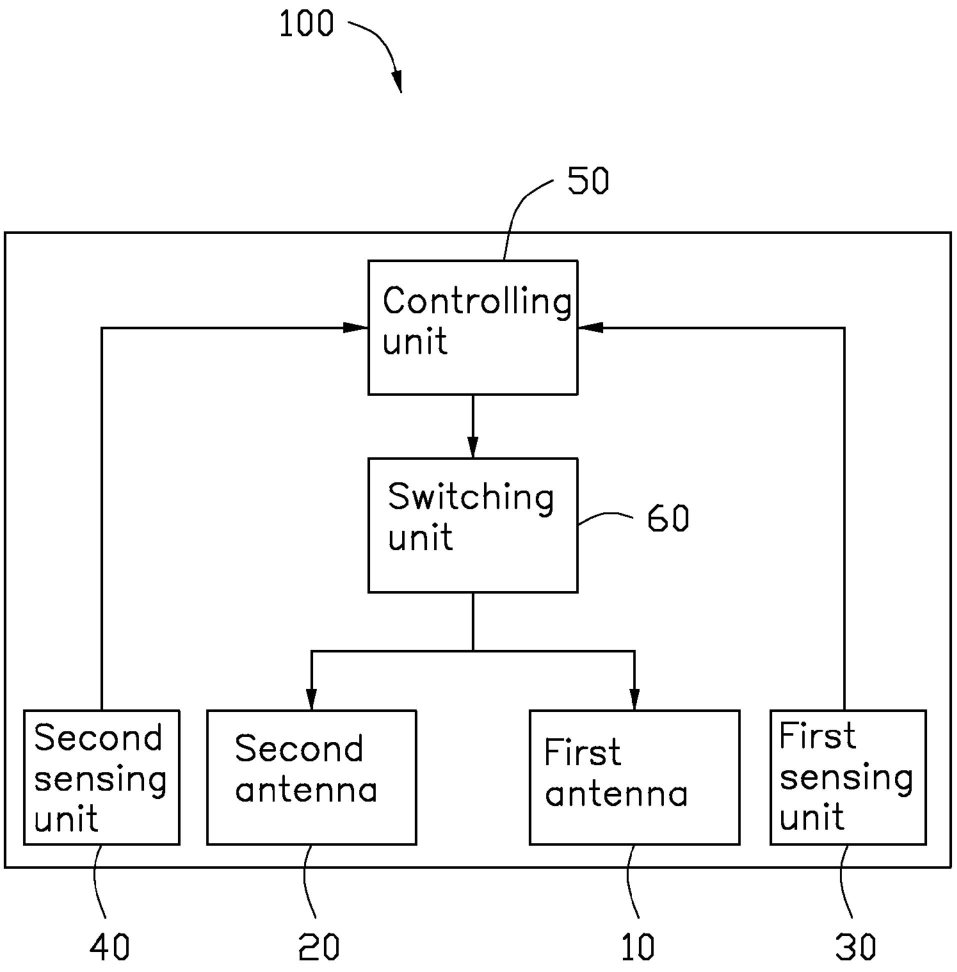
FIG. 2 is a block diagram of the antenna switching system of FIG. 1.

FIG. 2 shows the antenna switching system 100 further includes a controlling unit 50 and a switching unit 60. The controlling unit 50 may be a central processing unit (CPU) of the wireless communication device 200 and is electronically connected to the first sensing unit 30 and the second sensing unit 40.

The controlling unit 50 is configured to receive the sensing signals from the first sensing unit 30 and the second sensing unit 40 and determine a holding mode of the wireless communication device 200 according to the sensing signals. For example, when the controlling unit 50 receives the first sensing signal from the first sensing unit 30 and the second sensing signal from the second sensing unit 40, the controlling unit 50 determines that the wireless communication device 200 is at a first holding mode which represents that the user holds the right side of the wireless communication device 200. When the controlling unit 50 receives the second sensing signal from the first sensing unit 30 and the first sensing signal from the second sensing unit 40, the controlling unit 50 determines that the wireless communication device 200 is at a second holding mode which represents that the user holds the left side of the wireless communication device 200. When the controlling unit 50 receives the first sensing signals both from the first sensing unit 30 and the second sensing unit 40, the controlling unit 50 determines that the wireless communication device 200 is at a third holding mode which represents that the user holds both the left side and the right side of the wireless communication device 200. When the controlling unit 50 receives the second sensing signals both from the first sensing unit 30 and the second sensing unit 40, the controlling unit 50 determines that the wireless communication device 200 is not hold by the user.

The switching unit 60 is electronically connected to the controlling unit 50, the first antenna 10, and the second antenna 20. The controlling unit 50 switches working status of the first antenna 10 and the second antenna 20 through the switching unit 60. For example, when the controlling unit 50 determines that the wireless communication device 200 is at the first holding mode (that is, the user holds the right side of the wireless communication device 200), the controlling unit 50 switches the switching unit 60 to a first mode that the second antenna 20 is selected and the first antenna 10 is selected to work at the low-frequency band. Then, the wireless communication device 200 receives and sends wireless signals through the first antenna 10 and the second antenna 20. That is, the first antenna 10 works as a low-frequency antenna and the second antenna 20 works as a high-frequency antenna.

When the controlling unit 50 determines that the wireless communication device 200 is at the second holding mode (that is, the user holds the left side of the wireless communication device 200), the controlling unit 50 switches the switching unit 60 to a second mode that the first antenna 10 is selected and the second antenna 20 is turned off. Then, the wireless communication device 200 receives and sends wireless signals through the first antenna 10. That is, the first antenna 10 works as both a low-frequency antenna and a high-frequency antenna.

When the controlling unit 50 determines that the wireless communication device 200 is at the third holding mode (that is, the user holds both the left side and the right side of the wireless communication device 200), the controlling unit 50 switches the switching unit 60 to a third mode that both the first antenna 10 and the second antenna 20 are selected. Then, the wireless communication device 200 receives and sends wireless signals through the first antenna 10 and the second antenna 20. That is, the first antenna 10 works as a low-frequency antenna and a high-frequency antenna, and the second antenna 20 works as a high-frequency antenna to help the first antenna 10 to receive and send wireless signals in a high-frequency band.

In addition, when the controlling unit 50 determines that the wireless communication device 200 is not hold by the user, the controlling unit 50 switches the switching unit 60 to the second mode, that is, the first antenna 10 is selected and the second antenna 20 is turned off. The first antenna 10 can work at both the low-frequency band and the high-frequency band with a better radiating efficiency, which satisfies radiation requirements.

Figure 3:
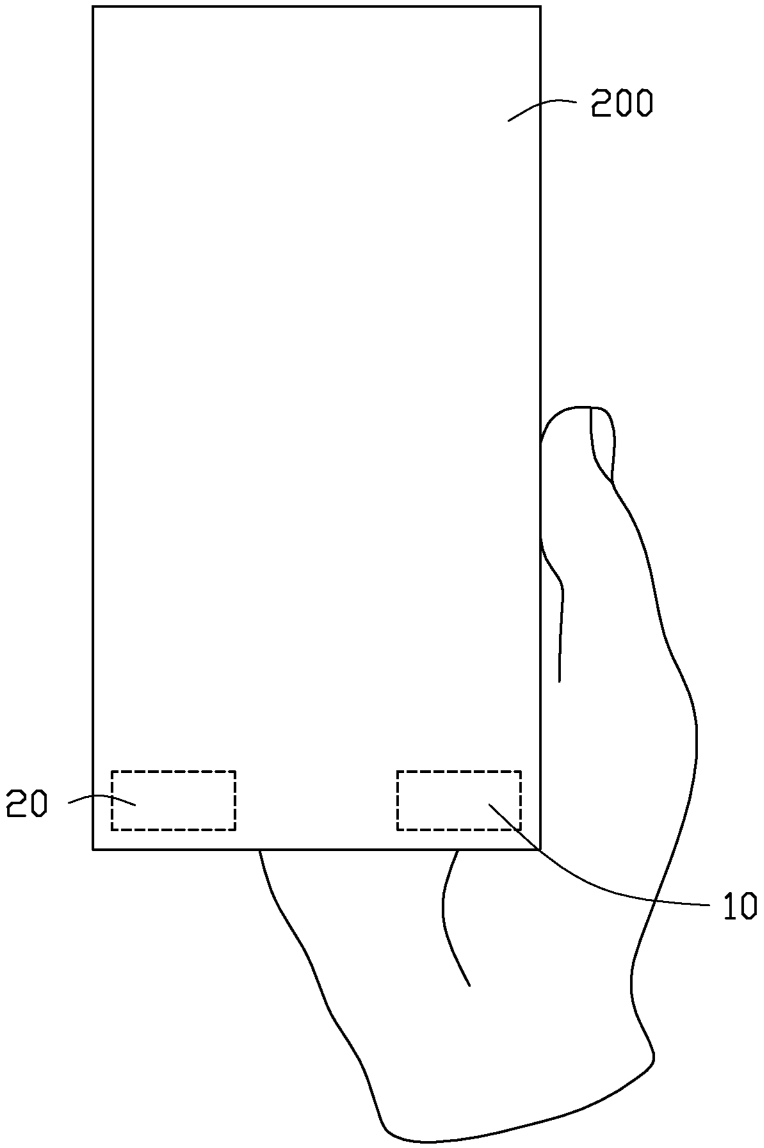
FIG. 3 is an isometric view of the wireless communication device, when the wireless communication device is at a first holding mode.

FIG. 3 shows the wireless communication device 200 is at the first holding mode, that is, the right side of the wireless communication device 200 is hold by the user. Then, the controlling unit 50 receives the first sensing signal from the first sensing unit 30 and the second sensing signal from the second sensing unit 40, and determines that the wireless communication device 200 is at the first holding mode. The controlling unit 50 switches the switching unit 60 to the first mode that the second antenna 20 is selected and the first antenna 10 is selected to work at the low-frequency band. Thus, the wireless communication device 200 receives and sends wireless signals through the first antenna 10 and the second antenna 20.

Figure 4:
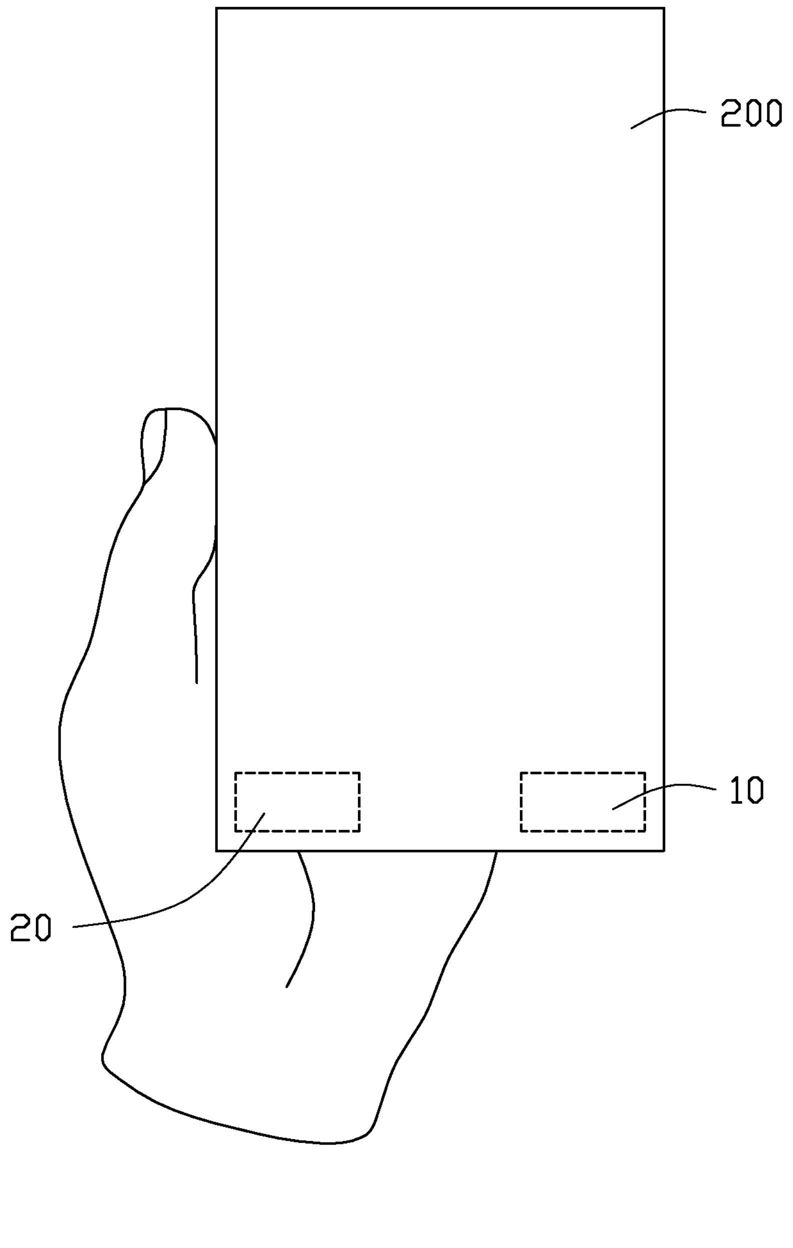
FIG. 4 is similar to FIG. 3, but showing the wireless communication device is at a second holding mode.

FIG. 4 shows the wireless communication device 200 is at the second holding mode, that is, the left side of the wireless communication device 200 is hold by the user. Then, the controlling unit 50 receives the second sensing signal from the first sensing unit 30 and the first sensing signal from the second sensing unit 40, and determines that the wireless communication device 200 is at the second holding mode. The controlling unit 50 switches the switching unit 60 to the second mode that the first antenna 10 is selected and the second antenna 20 is turned off. Thus, the wireless communication device 200 receives and sends wireless signals through the first antenna 10.

Figure 5:
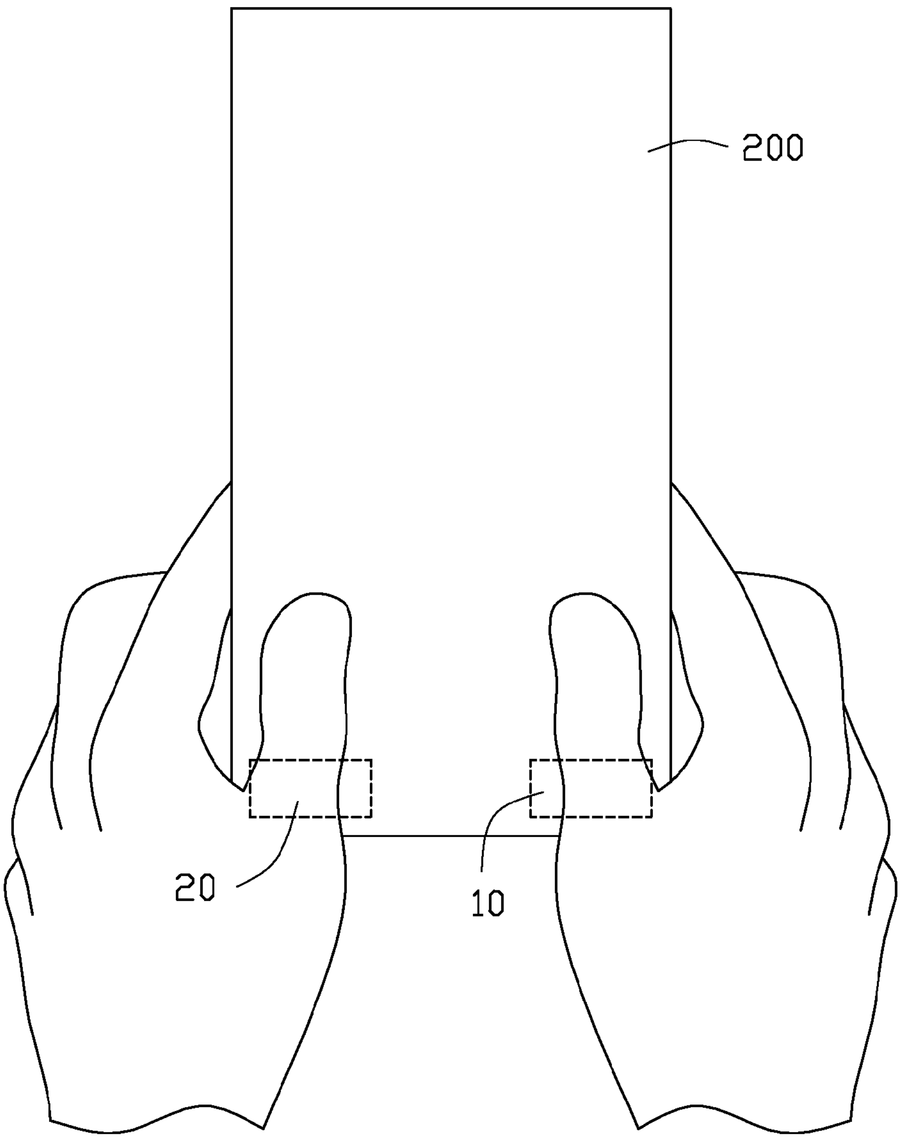
FIG. 5 is similar to FIG. 3, but showing the wireless communication device is at a third holding mode.

FIG. 5 shows the wireless communication device 200 is at the third holding mode, that is, both the left side and the right side of the wireless communication device 200 are hold by the user. Then, the controlling unit 50 receives the first sensing signals both from the first sensing unit 30 and the second sensing unit 40, and determines that the wireless communication device 200 is at the third holding mode. The controlling unit 50 switches the switching unit 60 to the third mode that both the first antenna 10 and the second antenna 20 are selected. Thus, the wireless communication device 200 receives and sends wireless signals through the first antenna 10 and the second antenna 20.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An antenna switching system comprising:
- a first antenna;
- a second antenna;
- a first sensing unit configured to detect a distance between an object and the first antenna;
- a second sensing unit configured to detect a distance between the object and the second antenna;
- a controlling unit electronically connected to the first sensing unit and the second sensing unit; and
- a switching unit electronically connected to the controlling unit, the first antenna, and the second antenna;
- wherein the controlling unit is configured to activate and deactivate the first antenna and the second antenna via the switching unit based on detections of the first sensing unit and the second sensing unit; and
- when the first sensing unit senses that the distance between the object and the first antenna is in a predetermined range, and the second sensing unit senses that the distance between the object and the second antenna is in the predetermined range, the controlling unit switches the switching unit to a mode that both the first antenna and the second antenna are selected.

2. The antenna switching system of claim 1, wherein the first antenna works at a low-frequency band and a high-frequency band, the second antenna works at the high-frequency band of the first antenna.

3. The antenna switching system of claim 2, wherein when the first sensing unit senses that the distance between the object and the first antenna is in a predetermined range, the controlling unit switches the switching unit to a first mode that the second antenna is selected and the first antenna is selected to work at the low-frequency band.

4. The antenna switching system of claim 1, wherein when the second sensing unit senses that the distance between the object and the second antenna is in a predetermined range, the controlling unit switches the switching unit to a second mode that the first antenna is selected and the second antenna is turned off.

5. The antenna switching system of claim 4, wherein when the first sensing unit senses that the distance between the object and the first antenna is out of the predetermined range, and the second sensing unit senses that the distance between the object and the second antenna is out of the predetermined range, the controlling unit switches the switching unit to the second mode.

6. The antenna switching system of claim 1, wherein the first sensing unit is adjacent to the first antenna and the second sensing unit is adjacent to the second antenna.

7. A wireless communication device comprising:
- an antenna switching system, the antenna switching system comprising:
  - a first antenna;
  - a second antenna;
  - a first sensing configured to detect a distance between an object and the first antenna;
  - a second sensing unit configured to detect a distance between the object and the second antenna;
  - a controlling unit electronically connected to the first sensing unit and the second sensing unit; and
  - a switching unit electronically connected to the controlling unit, the first antenna, and the second antenna;
- wherein the controlling unit is configured to determine a holding mode of the wireless communication device based on detections of the first sensing unit and the second sensing unit and activate and deactivate the first antenna and the second antenna via the switching unit according to the holding mode of the wireless communication device; and
- wherein the first sensing unit senses that the distance between the object and the first antenna is in a predetermined range, and the second sensing unit senses that the distance between the object and the second antenna is in the predetermined range, the controlling unit determines that the wireless communication device is at a third holding mode and switches the switching unit to a mode that both the first antenna and the second antenna are selected.

8. The wireless communication device of claim 7, further comprising a base board, a first metal member, and a second metal member, wherein the first metal member is positioned at a first side of the base board, the second metal member is positioned at a second side of the base board opposite to the first metal member.

9. The wireless communication device of claim 8, wherein the base board comprises a keep-out-zone, the first antenna is positioned in the keep-out-zone adjacent to the first metal member, and the second antenna is positioned in the keep-out-zone adjacent to the second metal member.

10. The wireless communication device of claim 9, wherein the first sensing unit is positioned in the keep-out-zone and adjacent to the first antenna, the second sensing unit is positioned in the keep-out-zone and adjacent to the second antenna.

11. The wireless communication device of claim 7, wherein the first antenna works at a low-frequency band and a high-frequency band, and the second antenna works at the high-frequency band of the first antenna.

12. The wireless communication device of claim 11, wherein when the first sensing unit senses that the distance between the object and the first antenna is in a predetermined range, the controlling unit determines that the wireless communication device is at a first holding mode and switches the switching unit to a first mode that the second antenna is selected and the first antenna is selected to work at the low-frequency band.

13. The wireless communication device of claim 7, wherein when the second sensing unit senses that the distance between the object and the second antenna is in the predetermined range, the controlling unit determines that the wireless communication device is at a second holding mode and switches the switching unit to a second mode that the first antenna is selected and the second antenna is turned off.

14. The wireless communication device of claim 13, wherein when the first sensing unit senses that the distance between the object and the first antenna is out of the predetermined range, and the second sensing unit senses that the distance between the object and the second antenna is out of the predetermined range, the controlling unit switches the switching unit to the second mode.

15. A wireless communication device comprising:

a base board;

a first metal member, the first metal member positioned at a first side of the base board;

a second metal member, the second metal member positioned at a second side of the base board opposite to the first metal member; and an antenna switching system, the antenna switching system comprising:

a first antenna;

a second antenna;

a first sensing configured to detect a distance between an object and the first antenna;

a second sensing unit configured to detect a distance between the object and the second antenna;

a controlling unit electronically connected to the first sensing unit and the second sensing unit; and a switching unit electronically connected to the controlling unit, the first antenna, and the second antenna;

wherein the controlling unit is configured to determine a holding mode of the wireless communication device based on detections of the first sensing unit and the second sensing unit and activate and deactivate the first antenna and the second antenna via the switching unit according to the holding mode of the wireless communication device.

16. The wireless communication device of claim 15, wherein the base board comprises a keep-out-zone, the first antenna is positioned in the keep-out-zone adjacent to the first metal member, and the second antenna is positioned in the keep-out-zone adjacent to the second metal member; wherein the first sensing unit is positioned in the keep-out-zone and adjacent to the first antenna, and the second sensing unit is positioned in the keep-out-zone and adjacent to the second antenna.

17. The wireless communication device of claim 15, wherein the first antenna works at a low-frequency band and a high-frequency band, and the second antenna works at the high-frequency band of the first antenna.

18. The wireless communication device of claim 17, wherein when the first sensing unit senses that the distance between the object and the first antenna is in a predetermined range, the controlling unit determines that the wireless communication device is at a first holding mode and switches the switching unit to a first mode that the second antenna is selected and the first antenna is selected to work at the low-frequency band.

19. The wireless communication device of claim 17, wherein when the second sensing unit senses that the distance between the object and the second antenna is in the predetermined range, the controlling unit determines that the wireless communication device is at a second holding mode and switches the switching unit to a second mode that the first antenna is selected and the second antenna is turned off.

20. The wireless communication device of claim 19, wherein when the first sensing unit senses that the distance between the object and the first antenna is out of the predetermined range, and the second sensing unit senses that the distance between the object and the second antenna is out of the predetermined range, the controlling unit switches the switching unit to the second mode.

* * * * *